(12) United States Patent
Garcia Navarro

(10) Patent No.: US 9,762,972 B2
(45) Date of Patent: Sep. 12, 2017

(54) METHODS AND APPARATUS FOR SELECTIVELY OBSCURING A RENDERING OF A MEDIA STREAM

(71) Applicant: EchoStar Technologies, L.L.C., Englewood, CO (US)

(72) Inventor: Carlos Garcia Navarro, Boulder, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/803,346

(22) Filed: Jul. 20, 2015

(65) Prior Publication Data

US 2017/0026695 A1    Jan. 26, 2017

(51) Int. Cl.
| | | |
|---|---|---|
| H04N 21/488 | (2011.01) | |
| H04N 21/45 | (2011.01) | |
| H04N 21/436 | (2011.01) | |
| H04N 21/442 | (2011.01) | |
| H04N 21/41 | (2011.01) | |
| H04N 21/44 | (2011.01) | |
| H04N 21/43 | (2011.01) | |
| H04N 21/458 | (2011.01) | |
| H04N 21/40 | (2011.01) | |
| H04N 21/433 | (2011.01) | |
| H04N 21/462 | (2011.01) | |
| H04N 21/482 | (2011.01) | |

(52) U.S. Cl.
CPC ......... *H04N 21/4882* (2013.01); *H04N 21/40* (2013.01); *H04N 21/41* (2013.01); *H04N 21/4135* (2013.01); *H04N 21/43* (2013.01); *H04N 21/4334* (2013.01); *H04N 21/43622* (2013.01); *H04N 21/44* (2013.01); *H04N 21/442* (2013.01); *H04N 21/44222* (2013.01); *H04N 21/44231* (2013.01); *H04N 21/45* (2013.01); *H04N 21/4583* (2013.01); *H04N 21/4622* (2013.01); *H04N 21/482* (2013.01)

(58) Field of Classification Search
None
See application file for complete search history.

(56) References Cited

U.S. PATENT DOCUMENTS

| | | | | |
|---|---|---|---|---|
| 2006/0130106 A1* | 6/2006 | Iwata | ............... | G11B 20/10 725/105 |
| 2007/0250887 A1* | 10/2007 | Ting | ............... | H04N 7/17318 725/110 |
| 2009/0265743 A1* | 10/2009 | Gao | ............... | H04N 7/17327 725/94 |

(Continued)

*Primary Examiner* — Justin Shepard
(74) *Attorney, Agent, or Firm* — Perkins Coie LLP

(57) ABSTRACT

Various embodiments of systems, apparatus, and/or methods are described for selectively obscuring a rendering of a media stream. In one implementation, the method includes receiving a request to render the media stream. The media stream is accessed through a first media source. A content identifier is identified for an event within the requested media stream. Based upon the content identifier, it may be discovered that the event is accessible through at least one second media source. The rendering of the requested media stream may then be obscured and a notification provided to a user that the event within the requested media stream is accessible through at least one second media source.

16 Claims, 10 Drawing Sheets

(56) References Cited

U.S. PATENT DOCUMENTS

2009/0313651 A1* 12/2009 Ikeguchi ................ H04N 7/163
725/30
2010/0310237 A1* 12/2010 Daigle ............... H04N 5/44543
386/296

* cited by examiner

METHODS AND APPARATUS FOR SELECTIVELY OBSCURING A RENDERING OF A MEDIA STREAM

BACKGROUND

Receiving devices, such as set-top boxes for satellite and cable television services, allow a user to view media streams from a variety of media sources. The receiving device generally renders a media stream shortly after receiving a request from the user to view the media stream. For example, the user may send a request to the receiving device to change to a different television channel, then the receiving device tunes to the new television channel and renders the media stream from the new television channel. In some cases, the media stream the user requested may include an event that is currently in-progress. In these cases, when the receiving device renders the media stream, the user may be shown the in-progress event, potentially causing the event to be spoiled for the user.

SUMMARY

The present disclosure relates to systems, methods, and apparatus for selectively obscuring a rendering of a media stream. In one implementation, the method includes, receiving a request to render the media stream, wherein the media stream is accessed through a first media source; identifying a content identifier for an event within the requested media stream; based upon the content identifier, discovering that the event is accessible through at least one second media source; obscuring the rendering of the requested media stream; and providing a notification that the event within the requested media stream is accessible through the at least one second media source.

In some examples, the method further includes receiving a command to access the event through the at least one second media source. In some examples, the method further includes receiving a command to unobscure the rendering of the requested media stream. In some examples, the first media source comprises a first television channel from a first broadcast station. In some examples, the at least one second media source comprises a storage medium. In some examples, the storage medium includes user-recorded content, automatically-recorded content, or a combination thereof. In some examples, the at least one second media source comprises one or more of an on-demand media streaming service, a pay-per-view media streaming service, an over-the-top media streaming service, and a second television channel from a second broadcast station. In some examples, the notification obscures the rendering of the requested media stream. In some examples, the notification comprises one or more of a visual notification, an audio notification, or a tactile notification. In some examples, the notification provides information about the event within the requested media stream. In some examples, the method further includes identifying a scheduled start time of the event within the requested media stream, wherein the request to render the media stream occurs after the scheduled start time. In some examples, the scheduled start time of the event is outside of a predetermined time window. In some examples, the at least one second media source comprises a recording of the event, the recording including the beginning of the event. In some examples, obscuring the requested media stream includes generating an overlay over the visual rendering of the requested media stream; and muting the audio rendering of the requested media stream.

In some examples, the event within the media stream is available through the at least one second media source at a later time. In some examples, the method further includes receiving a command to record the event within the media stream at the later time.

In another implementation, a receiving device for selectively obscuring a rendering of a media stream includes a user communication module for receiving a request to render the media stream, wherein the media stream is accessed through a first media source; control logic for identifying a content identifier for an event within the requested media stream, and, based upon the content identifier, discovering that the event is accessible through at least one second media source; and a rendering module for obscuring the rendering of the requested media stream, and generating a notification that the event within the requested media stream is accessible through the at least one second media source.

In another implementation, a system for selectively obscuring a rendering of a media stream includes a receiving device and a presentation device. The receiving device includes a user communication module for receiving a request to render the media stream, wherein the media stream is accessed through a first media source; control logic for identifying a content identifier for an event within the requested media stream, and, based upon the content identifier, discovering that the event is accessible through at least one second media source; and a rendering module for obscuring the rendering of the requested media stream, and generating a notification that the event within the requested media stream is accessible through the at least one second media source. The presentation device displays the notification.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate the reception, processing, rendering, and outputting of media content. More particularly, the various embodiments described herein provide for the identification of an event within a media stream that is accessible through another media source. The various embodiments further provide for obscuring the media stream while the user decides whether to switch to the other media source. In short, various embodiments described herein provide apparatus, systems and/or methods for alerting a user that an event within a media stream is accessible elsewhere before the media stream is presented to the user.

In at least one embodiment, the media stream to be received, processed, rendered, outputted and/or communicated may come in any form of a media stream. Exemplary media stream formats include Motion Picture Experts Group (MPEG) standards, Flash, Windows Media and the like. It is to be appreciated that the media stream may be supplied by any source, such as an over-the-air broadcast, a satellite, or cable television distribution system, a digital video disk (DVD) or other optical disk, the Internet or other communication networks, and the like. In at least one embodiment, the media data may be associated with supplemental data that includes text data, such as closed captioning data or subtitles. Particular portions of the closed captioning data may be associated with specified portions of the media data.

Generally, a media stream is a contiguous block of associated audio and video data that may be transmitted to, and received by, an electronic device, such as a terrestrial ("over-the-air") television receiver, a cable television receiver, a satellite television receiver, an Internet connected television or television receiver, a computer, a portable electronic device, or the like. In at least one embodiment, a media stream includes an event. The event may be a contiguous block of programming from a television channel (e.g., an episode of a television show) or other identifiable media content. For example, the event may correspond to the programming on a single channel between 7:00 and 8:00, which may correspond with a single episode of a television program.

Further, a media stream may be delivered by any transmission method, such as broadcast, multicast, simulcast, closed circuit, pay-per-view, on-demand, over-the-top (by "streaming," file transfer, or other means), or other methods. Additionally, the media stream may be transmitted by way of any communication technology, such as by satellite, wire or optical cable, wireless, or other means. The media stream may also be transferred over any type of communication network, such as the Internet or other wide area network, a local area network, a private network, a mobile communication system, a terrestrial television network, a cable television network, and a satellite television network.

Figure 1:
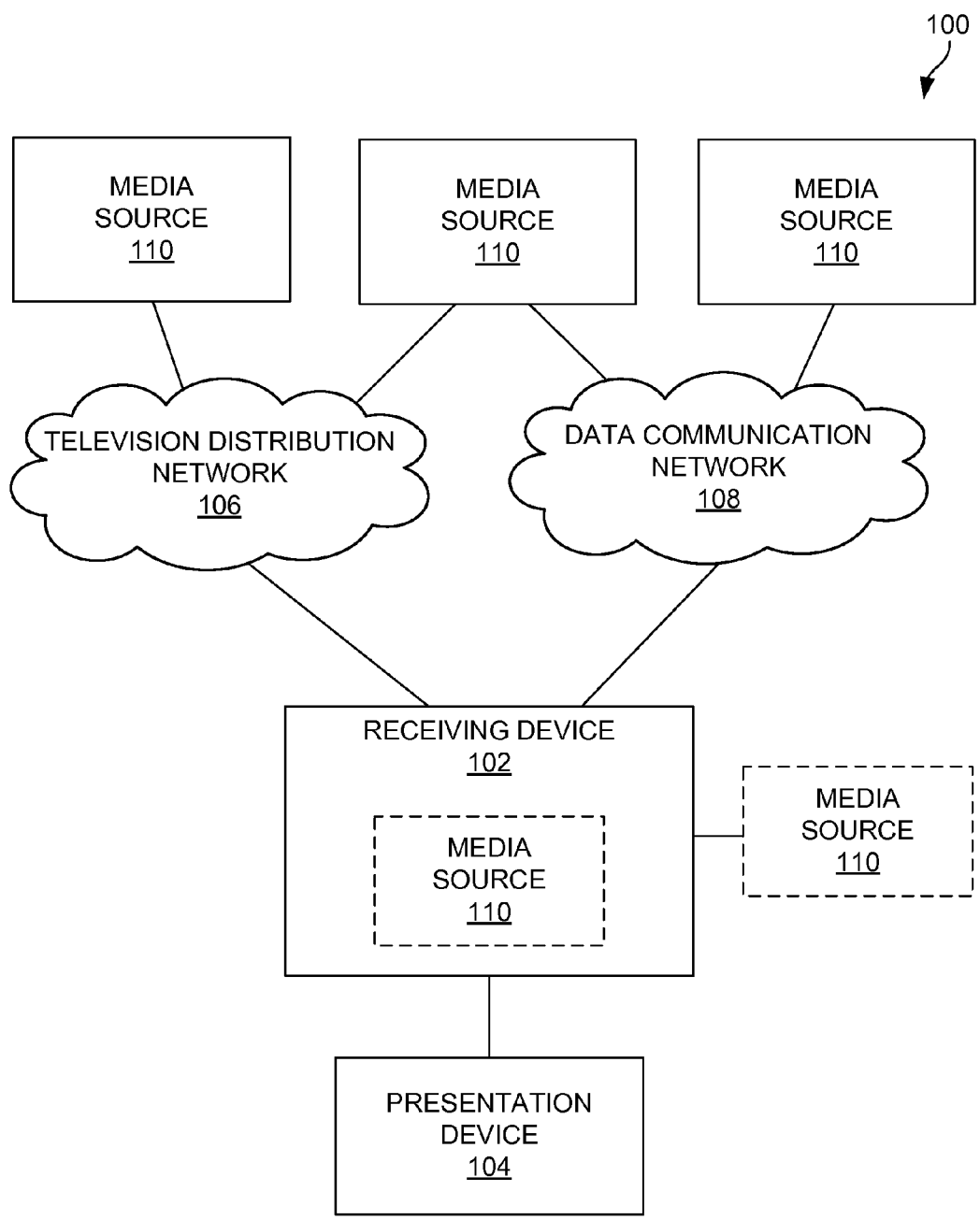
FIG. 1 illustrates an embodiment of a system for presenting a media stream to a user.

FIG. 1 illustrates an embodiment of a system 100 for presenting a media stream to a user. The system of FIG. 1 is operable for identifying an event within a media stream, and discovering the event is accessible through another media source. The system 100 includes a receiving device 102, a presentation device 104 (e.g., a display and speakers), a television distribution network 106, and a data communication network 108. Media sources 110 provide media streams to the television distribution network 106 and/or data communication network 108, which in turn transmit the media streams to the receiving device 102. In some embodiments, media sources 110 provide media streams directly to the receiving device 102 (either internally or externally of the receiving device 102). Examples of media sources may include a television channel from a broadcast station, a storage medium containing user-recorded content, automatically-recorded content, and/or purchased content, an on-demand media streaming service, a pay-per-view media streaming service, and/or an over-the-top media streaming service. The media sources 110 may provide media streams to one or more of the television distribution network 106, the data communication network 108, and the receiving device 102.

The receiving device 102 may access the media sources 110 in various ways. For example, the receiving device 102 may access a television channel by demodulating and decrypting a media stream from the television distribution network 106. The receiving device 102 may access an over-the-top media streaming service by logging into a remote server and downloading the media stream over the data communication network 108. In some embodiments, the receiving device 102 may check the user's subscription to the over-the-top media streaming service and/or offer a subscription to the over-the-top media streaming service. The receiving device 102 may access a storage medium connected to the receiving device 102 using a local communication bus, such as parallel ATA (PATA, also called IDE or EIDE), Serial ATA (SATA), SCSI, Serial Attached SCSI (SAS), Fibre Channel, IEEE 1394 (also called FireWire), USB, SCSI, or Thunderbolt.

The television distribution network 106 may be any distribution network capable of distributing a media stream. Exemplary distribution networks include over-the-air, satellite, and cable television networks. The data communication network 108 may be any communication network capable of transmitting a media stream. Exemplary communication networks include wireless communication networks, public switched telephone networks (PSTN), local area networks (LAN), and wide area networks (WAN) providing data communication services and/or Internet access. The television distribution network 106 and communication network 108 may utilize any desired combination of wired (e.g., cable and fiber) and/or wireless (e.g., cellular, satellite, microwave, and radio frequency) communication mediums and any desired network topology (or topologies when multiple mediums are utilized).

The receiving device 102 of FIG. 1 may be any device capable of receiving a media stream from the television distribution network 106, the data communication network 108, and/or directly from a media source 110 (either internal or external of the receiving device 102). For example, in the case of the television distribution network 106 being a cable or satellite television network, the receiving device 102 may be a set-top box configured to communicate with the television distribution network 106. The receiving device 102 may be a digital video recorder in some embodiments. In another example, the receiving device 102 may be computer, a personal digital assistant (PDA), or similar device configured to communicate with the Internet or comparable data communication network 108. The receiving device 102 may receive, capture, and record media streams from non-broadcast media sources, such as video recorders, DVD players, personal computers or the Internet.

The presentation device 104 may be any device configured to receive an audio/video stream from the receiving device 102 and present the audio/video stream to a user.

Examples of the presentation device 102 include a television, a video monitor, or similar device capable of presenting audio and video information to a user. The receiving device 102 may be communicatively coupled to the presentation device 104 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 104 may be integrated within the receiving device 102. For example, each of a computer, a PDA, and a mobile communication device may serve as both the receiving device 102 and the presentation device 104 by providing the capability of receiving media streams from the television distribution network 106, the data communication network 108, and/or directly from a media source 110, and presenting the received media streams to a user. In another implementation, a cable-ready television may include a converter device for receiving media streams from the television distribution network 106, the data communication network 108, and/or directly from a media source 110, and displaying the media streams to a user.

In the system 100, a user requests the receiving device 102 to render a media stream provided by one or more media sources 110. The media stream includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations or by other media sources 110.

In some embodiments, supplemental data may be associated with a media stream. The supplemental data may include a content identifier that identifies an event (e.g., a television program) within the media stream. In one implementation, the supplemental data may be embedded within the media stream during transmission across the television distribution network 106 or the data communication network 108 to the receiving device 110. In other embodiments, the supplemental data may be transmitted separately from the media stream. For example, the receiving device 102 may receive electronic program guide information that provides content identifiers for events corresponding to specific dates, times, and media sources 110. The receiving device 102 may utilize the content identifiers to identify an event within the media stream, and discover whether the event is accessible through a different media source 110. In one implementation, the receiving device 102 may identify the event within the media stream based on a content identifier associated with a specific time, date, and media source 110.

Once the event within the media stream has been identified, the receiving device 102 may identify a start time for the event. The start time may be identified based on the content identifier or based on other programming information. If the start time occurred or will occur within a predetermined time window (e.g. 10 minutes before or after the current time), then the receiving device 102 may render the media stream and transmit a rendered audio/video stream to the presentation device 104. In some implementations, the length of the predetermined time window may set by the user.

If the start time occurred or will occur outside of the predetermined time window (e.g., the event started 15 minutes before the current time), then the receiving device 102 may identify whether the event is accessible through a different media source 110. The receiving device 102 may identify the events that are accessible through other media sources 110 using supplemental data from each of the media sources 110. Alternatively or in addition, the receiving device 102 may identify the events accessible through the other media sources 110 using electronic program guide information, recorded program information, or other programming information resources (e.g., a programming repository accessible through the Internet).

If the event is accessible through a different media source 110, then the receiving device 102 may obscure the rendering of the requested media stream and notify the user that the event is accessible through another media source 110. The receiving device 102 may obscure the rendering of the requested media stream in various ways. For example, the receiving device 102 may blur, pixelate, distort, obstruct, or otherwise prevent video of the requested media stream from being clearly viewed. In some embodiments, the video may be obstructed by a notification that the event is accessible through another media source 110. The receiving device 102 may also mute, distort, or otherwise prevent audio of the requested media stream from being clearly heard. In this way, the receiving device 102 prevents the user from viewing an event that has already started, and gives the user the option of viewing the event from the beginning.

In some embodiments, the receiving device 102 may delay or prevent access to the requested media stream if the event is accessible through a different media source 110. For example, a user may request the receiving device 102 to tune to a particular television channel. Before tuning to the requested television channel, the receiving device 102 may determine that the event currently being broadcast on the requested television channel is available from a different media source 110. The receiving device 102 may then delay tuning to the requested television channel and display a notification that the event is accessible through another media source 110. The receiving device 102 may delay tuning to the requested television channel for a predetermined amount of time (e.g., 1 minute). If the receiving device 102 does not receive a command from the user to switch to the other media source 110, then the receiving device 102 may proceed with tuning to the requested television channel.

Figure 2:
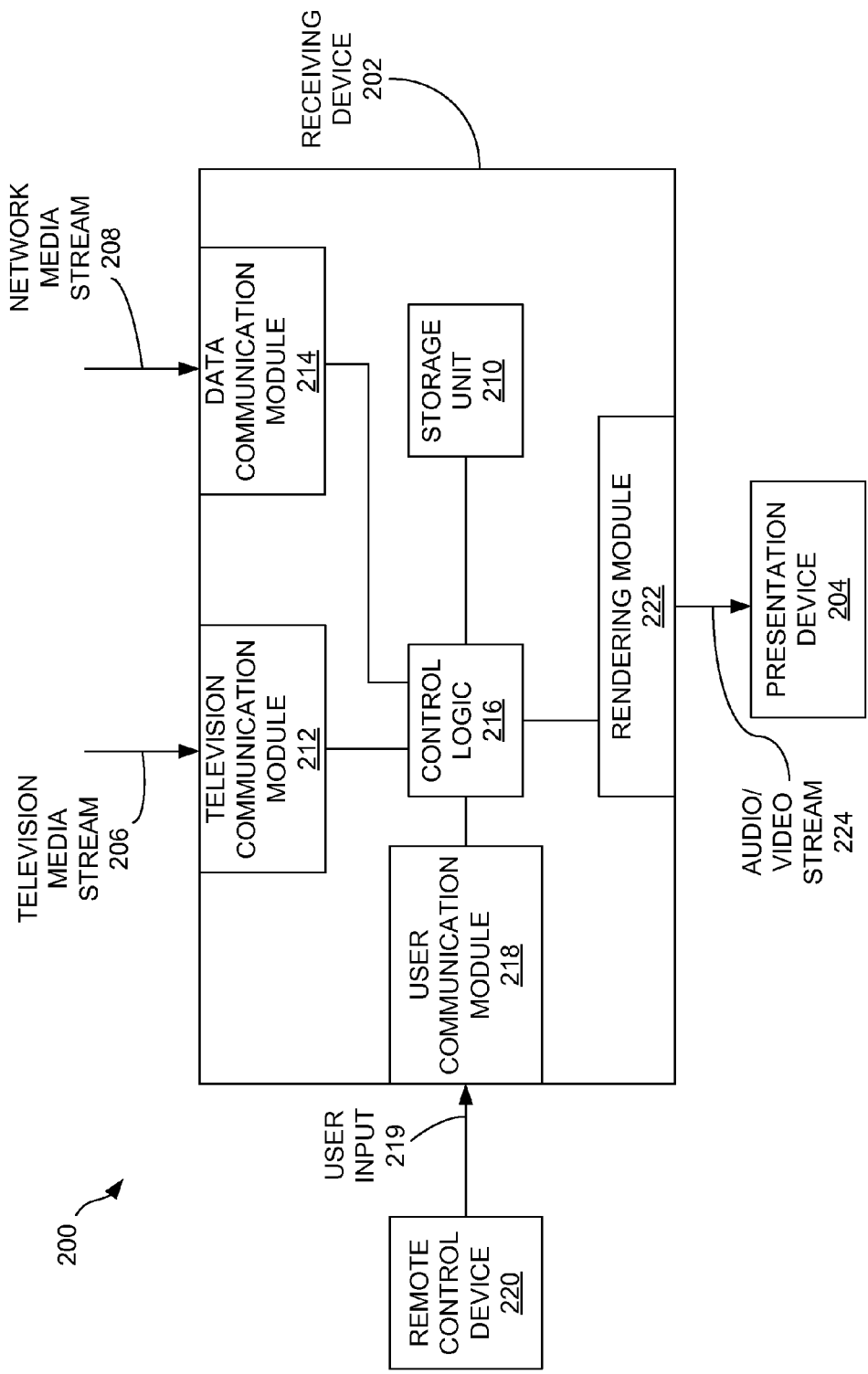
FIG. 2 illustrates an embodiment of a receiving device in a system for presenting a media stream to a user.

FIG. 2 illustrates an embodiment of a receiving device 202 in a system 200 for presenting a media stream to a user. The receiving device 202 may be an example of the receiving device 102 described in reference to FIG. 1. The receiving device 202 will be described with reference to the television distribution network 106, data communication network 108, and media sources 110 described in the system 100 of FIG. 1. The receiving device 202 includes a television communication module 212 and a data communication module 214. The television communication module 212 receives a television media stream 206 from a television distribution network 106. The data communication module 214 receives a network media stream 208 from a data communication network 108. One or more storage units 210 may be included internal and/or external to the receiving device 210. The storage unit 210 may store a media stream and act as a media source 110 for the receiving device 202.

The receiving device 202 may also include user communication module 218, control logic 216, and a rendering module 222. The user communication module 218 receives user input 219 from a remote control device 220. The user communication module 218 may also transmit signals to the remote control device 220. The control logic 216 is operable to control the reception of media streams from the television communication module 212, the data communication module 214, and the storage unit 210. The control logic 216 may also coordinate the storage of a media stream to the storage unit 210. The control logic 216 may then coordinate the output of a media stream to the rendering module 222. The rendering module 222 renders a media stream and outputs an audio/video stream 224 to a presentation device 204. Furthermore, the receiving device 202 and system 200 may include other components, modules, elements, or devices not illustrated for the sake of brevity.

The television receiving module 212 may receive a television media stream 206 from any type of television distribution network 106. For example, the television receiving module 212 may be capable of receiving a high definition television media stream, a standard definition television media stream, a 3-D television media stream, or other types of media streams.

The data communication module 214 may receive a network media stream 208 from any type of data communication network 108. For example, the data communication module 214 may be capable of receiving a media stream from the Internet (i.e., an over-the-top media stream), a media stream from network storage device attached to a LAN or WLAN (e.g., network attached storage), or other types of media streams transmitted over a data communication network.

In at least one embodiment, the user communication module 218 may receive a user input 219 including a request to render a media stream. For example, the user may request the receiving device 202 to render a television media stream 206 corresponding to a particular broadcast channel. The control logic 216 may then instruct the television communication module 212 to tune to the particular broadcast channel carrying the requested television media stream 206. The television media stream 206 may include a content identifier identifying an event (e.g. television program) within the requested television media stream. The content identifier may identify an event corresponding to a particular date, time, and media source 110. The control logic 216 may utilize the content identifier to identify the event within the requested television media stream 206. Alternatively or in addition, the control logic 216 may receive the content identifier for the event separately from the television media stream 206. For example, the receiving device 202 may receive electronic program guide information through the data communication module 214 that provides content identifiers for events corresponding to many dates, times, and media sources 110. The control logic 216 may parse the electronic program guide information to identify the event within the requested television media stream 206.

Once the event within the requested television media stream 206 has been identified, the control logic 216 may identify a start time for the event. The start time may be identified based on the content identifier or based on other programming information. If the start time occurred or will occur within a predetermined time window (e.g. 10 minutes before or after the current time), then the control logic 216 may coordinate the rendering module 222 to render the requested television media stream 206 and transmit an audio/video stream 224 to the presentation device 204.

If the start time occurred or will occur outside of the predetermined time window (e.g., the event started 15 minutes before the current time), then the control logic 216 may identify whether the event is accessible through a different media source 110. For example, the control logic 216 may identify the event was previously stored in the storage unit 210. Alternatively or in addition, the control logic 216 may identify an over-the-top media resource (e.g., a website) that can stream the event using the data communication network 108. Alternatively or in addition, the control logic 216 may identify another broadcast channel the television communication module 212 may tune to access the event with a later start time. The control logic 216 may also identify other types of media sources 110 that can provide a stream of the event. The control logic 216 may identify the events that are accessible through other media sources 110 using supplemental data from each of the media sources 110. Alternatively or in addition, the control logic 216 may identify the events accessible through the other media sources 110 using electronic program guide information, recorded program information, or other programming information resources (e.g., a programming repository accessible through the Internet).

If the event is accessible through another media source 110, then the control logic 216 may instruct the rendering module 222 to obscure the rendering of the requested television media stream 206 and notify the user that the event is accessible through another media source 110. The rendering module 222 may obscure the rendering of the requested media stream in various ways. For example, the rendering module 222 may blur, pixelate, distort, obstruct, or otherwise prevent video of the requested media stream from being clearly viewed. The rendering module 222 may also mute, distort, or otherwise prevent audio of the requested media stream from being clearly heard.

In some embodiments, the rendering module 222 may obscure the requested television media stream 206 by overlaying a notification over the video stream and muting the audio stream. The notification may notify the user the starting time of the event has passed and that the event is accessible through another media source 110. In this way, the receiving device 202 prevents the user from viewing an event that has already started, and gives the user the option of viewing the event from the beginning using a different media source 110.

In some embodiments, the receiving device 202 may begin loading the event from another media source 110 before receiving a command from the user to access the other media source 110. For example, when the control logic 216 identifies that an event is accessible through another media source 110, the receiving device 202 may automatically access the other media source and begin loading the media stream from the other media source 110 into the storage unit 210 or other storage means. Alternatively or in addition, the receiving device 202 may begin displaying the media stream from the other media source 110 in a picture-in-picture display, within the notification display, or in another background display.

Figure 3:
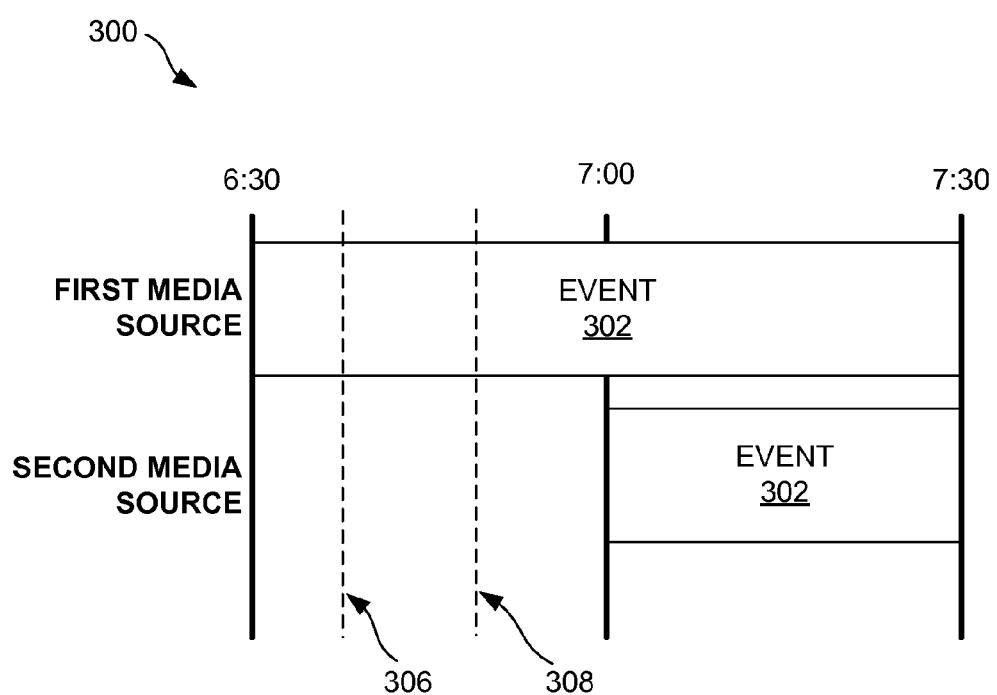
FIG. 3 illustrates an embodiment of a time schedule for events which may be received by the receiving device.

FIG. 3 illustrates an embodiment of a time schedule 300 for events which may be received by the receiving device 102, 202 of FIGS. 1 and 2. As illustrated in time schedule 300, an event 302 from a first media source have a starting time of 6:30. A second media source may stream the same event 302 at 7:00. The receiving device may have a predetermined time window 306 after the starting time of an event (e.g., 10 minutes). A user may request the receiving device to render the event from the first media source at the request time 308. Since the request time 308 is outside the predetermined time window 306, the receiving device may obscure the stream from the first media source and notify the user that the second media source will be streaming the same event 302 at 7:00. The user may have the option of unobscuring the stream from the first media source and watching the in-progress event 302, or switching to the second media source and watching the event 302 at 7:00. Alternatively or in addition, the user may have the option of scheduling the receiving device to record the event 302 occurring at 7:00 through the second media source. In one implementation, the first media source may be a first broadcast channel, and the second media source may be a second broadcast channel. In another implementation, the first may be a first broadcast channel, and the second media source may be a pay-per-view media source. Other combinations of media sources are also possible, such as on-demand media streams, over-the-top media streams, previously recorded media streams, and/or media streams currently being recorded.

Figure 4:
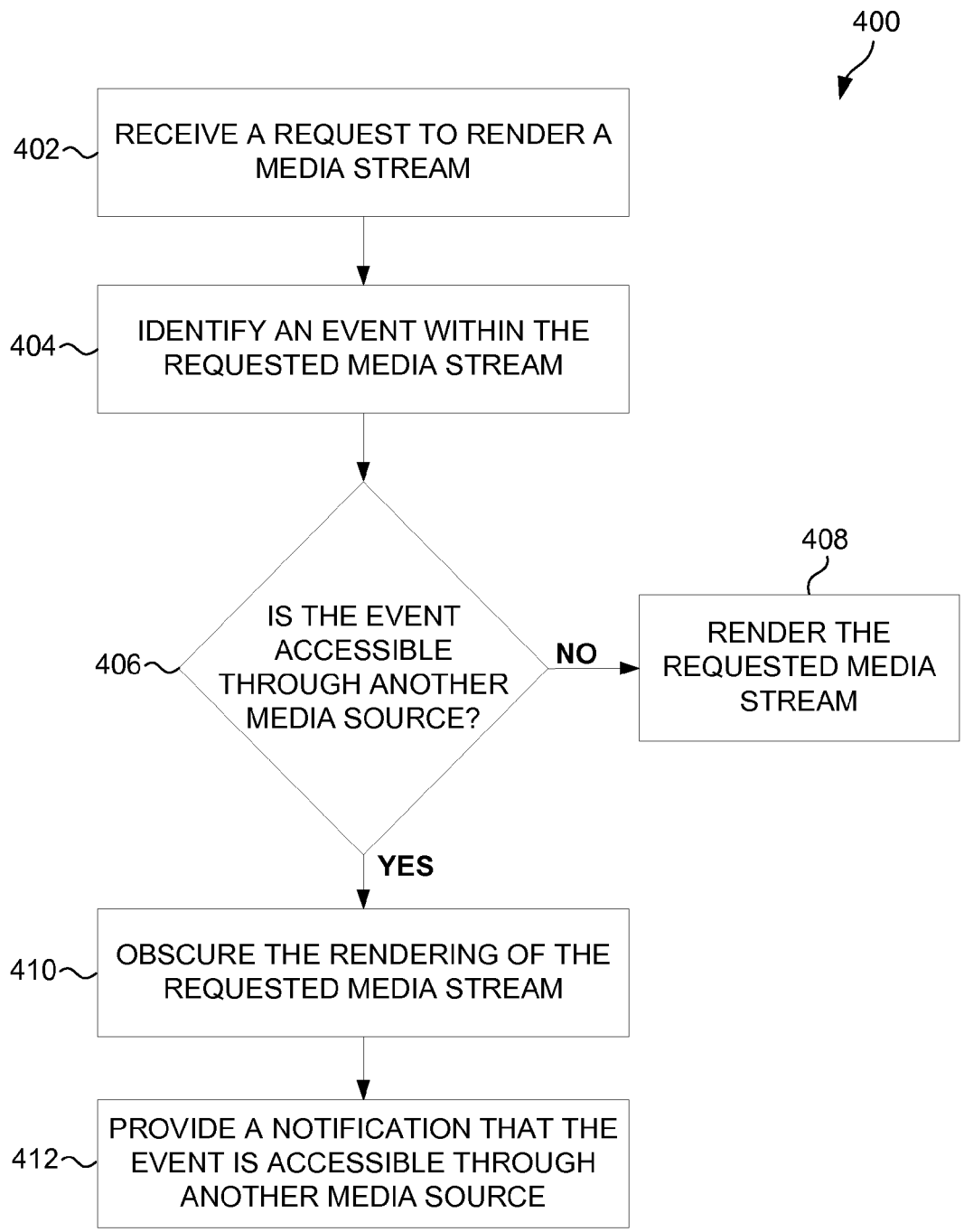
FIG. 4 illustrates an embodiment of a process for selectively obscuring a rendering of a media stream.

FIG. 4 illustrates an embodiment of a process 400 for selectively obscuring a rendering of a media stream. The operations of FIG. 4 are discussed in reference to the systems and receiving devices described in reference to FIGS. 1 and 2. The operations of the process 400 of FIG. 4 are not all-inclusive, and may comprise additional operations described herein, and/or other operations not illustrated for the sake of brevity.

The process 400 includes receiving a request to render a media stream (operation 402). The request may be received from a user using a remote control device to provide instructions to the receiving device. The media stream is accessed through a media source. In some examples, the media source may include a television channel from a broadcast station, a storage medium containing user-recorded content, automatically-recorded content, and/or purchased content, an on-demand media streaming service, a pay-per-view media streaming service, or an over-the-top media streaming service.

The process 400 further includes identifying an event within the requested media stream (operation 404). The process 400 may also identify a scheduled start time of the event within the requested media stream. The process 400 may then identify whether the scheduled start time of the event is outside of a predetermined time window. The length of the predetermined time window may be set by the user.

The process 400 continues by identifying whether the event is accessible through another media source (operation 406). If the event is not accessible through another media source, then the process 400 renders the requested media stream (operation 408). If the event is accessible through another media source, then the process 400 obscures the rendering of the requested media stream (operation 410). In some examples, the process 400 may obscure the rendering of the requested media stream by generating an overlay over the visual rendering of the requested media stream and muting the audio rendering of the requested media stream.

The process 400 additionally provides a notification to the user that the event is accessible through the other media source (operation 412). In some examples, the notification may include one or more of a visual notification, an audio notification, or a tactile notification. The notification may provide information about the event, such as a name for the event, an episode number for the event, pricing information for the event, future times the event is accessible, and/or other media sources that provide access to the event. If the event is accessible at a future time, then the user may be given an option to record the event at the later time. In some implementations, operations 410 and 412 may be performed as one operation, where the notification also obscures the rendering of the requested media stream.

Thus, through the process 400 illustrated in FIG. 4, a user is selectively prevented from viewing an event and is also notified that the event may be viewed using a different media source.

Figure 5:
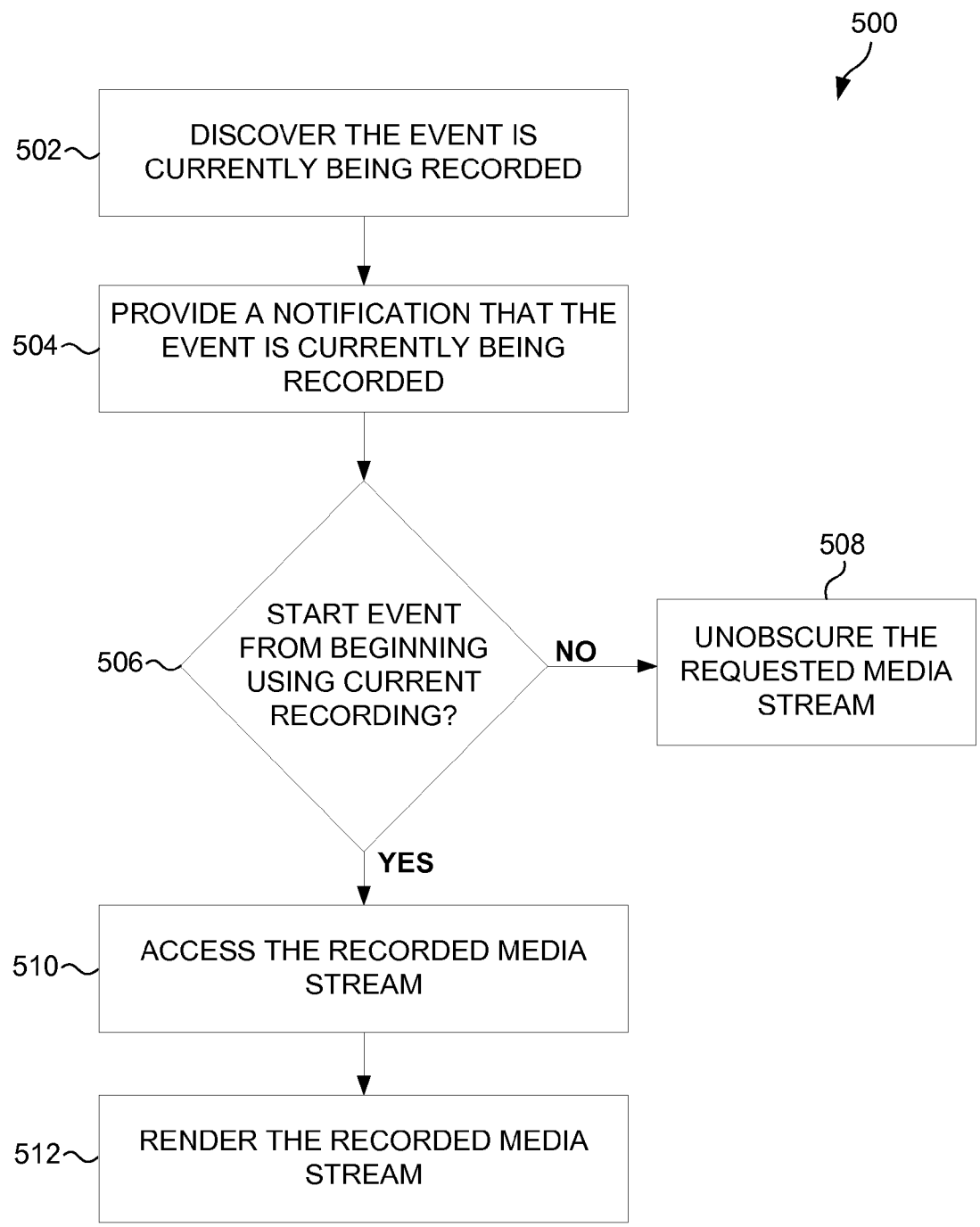
FIG. 5 illustrates an embodiment of a process for selectively accessing another media source.

FIG. 5 illustrates an embodiment of a process 500 for selectively accessing another media source. The operations of the process 500 of FIG. 5 are performed in combination with the operations of the process 400 of FIG. 4. Furthermore, the operations of FIG. 5 are discussed in reference to the systems and receiving devices described in reference to FIGS. 1 and 2. The operations of the process 500 of FIG. 5 are not all-inclusive, and may comprise additional operations described herein, and/or other operations not illustrated for the sake of brevity.

The process 500 includes discovering the event is currently being recorded by the receiving device (operation 502). For example, the receiving device may have previously been instructed to record the event to an internal or external storage unit. Operation 502 may be carried out as part of operation 406 illustrated in FIG. 4. For example, as part of identifying whether the event is accessible through another media source, the receiving device may discover that the event is currently being recorded (i.e., the event is accessible through the storage unit of the receiving device). Based on the discovery in operation 502, the process 500 then provides a notification to the user that the event is currently being recorded (operation 504). Operation 504 may be carried out as part of operation 412 illustrated in FIG. 4. For example, the notification provided in operation 412 may include an indication that the event is currently being recorded, and may ask the user whether to begin rendering the recorded media stream or to unobscure the requested media stream. The process 500 then receives the user's response to the notification and identifies whether to start the event from the beginning using the stream currently being recorded (operation 506). If the user instructs the receiving device not to start the event from the beginning, then the process 500 unobscures the requested media stream (operation 508) and provides the rendered audio/video stream to a presentation device. If the user instructs the receiving device to start the event from the beginning using the recorded media stream, then the process 500 accesses the recorded media stream from the storage unit (operation 510) and renders an audio/video stream from the recorded media stream (operation 512). Thus, through the process 500 illustrated in FIG. 5 (and the process 400 illustrated in FIG. 4), a user is selectively prevented from viewing an in-progress event and is given the option to view the event using a media stream being recorded by the receiving device.

Figure 6:
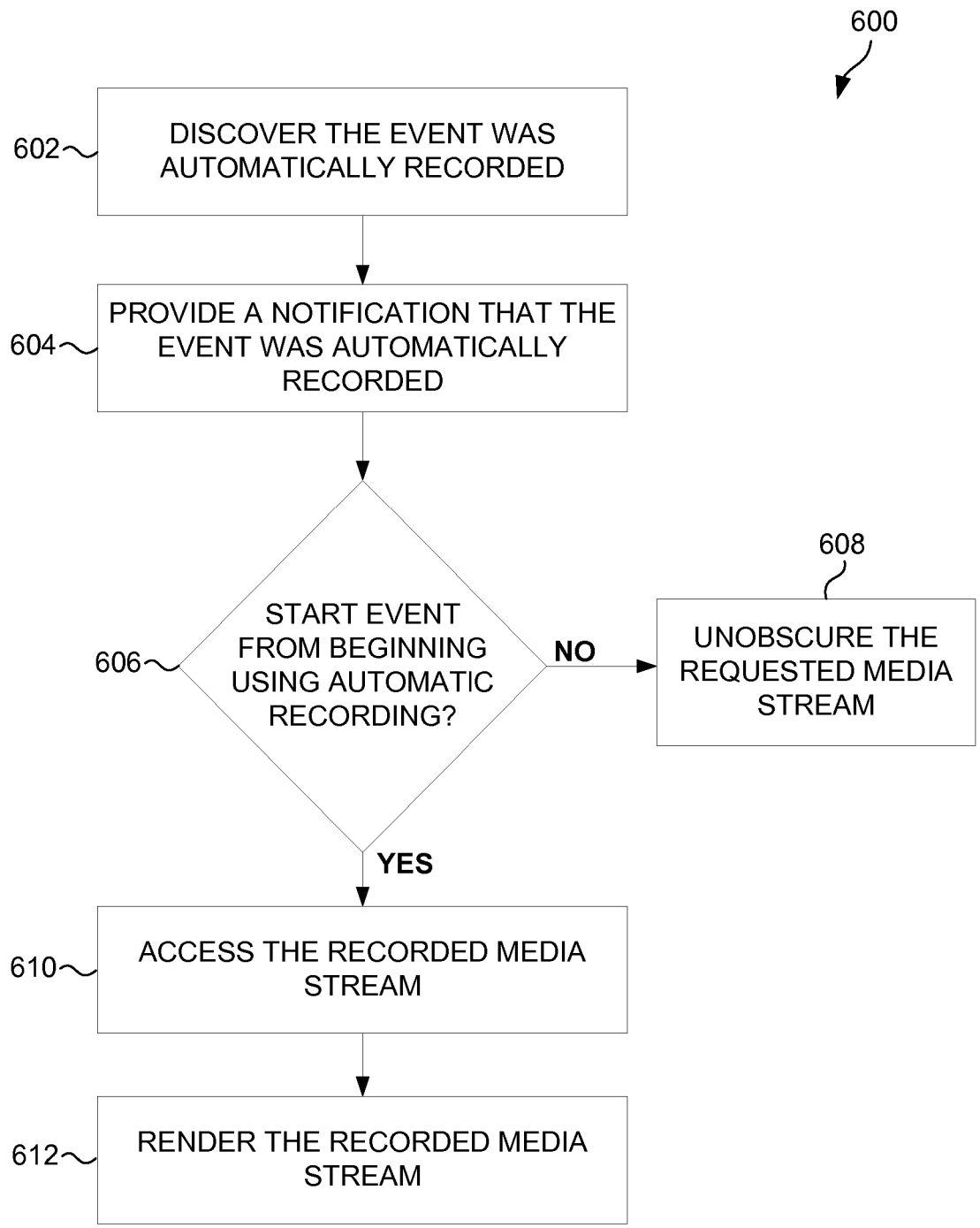
FIG. 6 illustrates an embodiment of a process for selectively accessing another media source.

FIG. 6 illustrates an embodiment of a process 600 for selectively accessing another media source. The operations of the process 600 of FIG. 6 are performed in combination with the operations of the process 400 of FIG. 4. Furthermore, the operations of FIG. 6 are discussed in reference to the systems and receiving devices described in reference to FIGS. 1 and 2. The operations of the process 600 of FIG. 6 are not all-inclusive, and may comprise additional operations described herein, and/or other operations not illustrated for the sake of brevity.

The process 600 includes discovering the event was automatically recorded by the receiving device (operation 602). For example, the receiving device may automatically record particular events that are predicted to be of interest to the user. The receiving device may record the particular events on an internal or external storage unit. Operation 602 may be carried out as part of operation 406 illustrated in FIG. 4. For example, as part of identifying whether the event is accessible through another media source, the receiving device may discover that the event was automatically recorded (i.e., the event is accessible through the storage unit of the receiving device). Based on the discovery in operation 602, the process 600 then provides a notification to the user that the event was automatically recorded (operation 604). Operation 604 may be carried out as part of operation 412 illustrated in FIG. 4. For example, the notification provided in operation 412 may include an indication that the event was automatically recorded, and may ask the user whether to begin rendering the recorded media stream or to unobscure the requested media stream. The process 600 then receives the user's response to the notification and identifies whether to start the event from the beginning using the automatically recorded media stream (operation 606). If the user instructs the receiving device not to start the event from the beginning, then the process 600 unobscures the requested media stream (operation 608) and provides the rendered audio/video stream to a presentation device. If the user instructs the receiving device to start the event from the beginning using the recorded media stream, then the process 600 accesses the recorded media stream from the storage unit (operation 610) and renders an audio/video stream from the recorded media stream (operation 612). Thus, through the process 600 illustrated in FIG. 6 (and the process 400 illustrated in FIG. 4), a user is selectively prevented from viewing an in-progress event and is given the option to view the event using a media stream that was automatically recorded by the receiving device.

Figure 7:
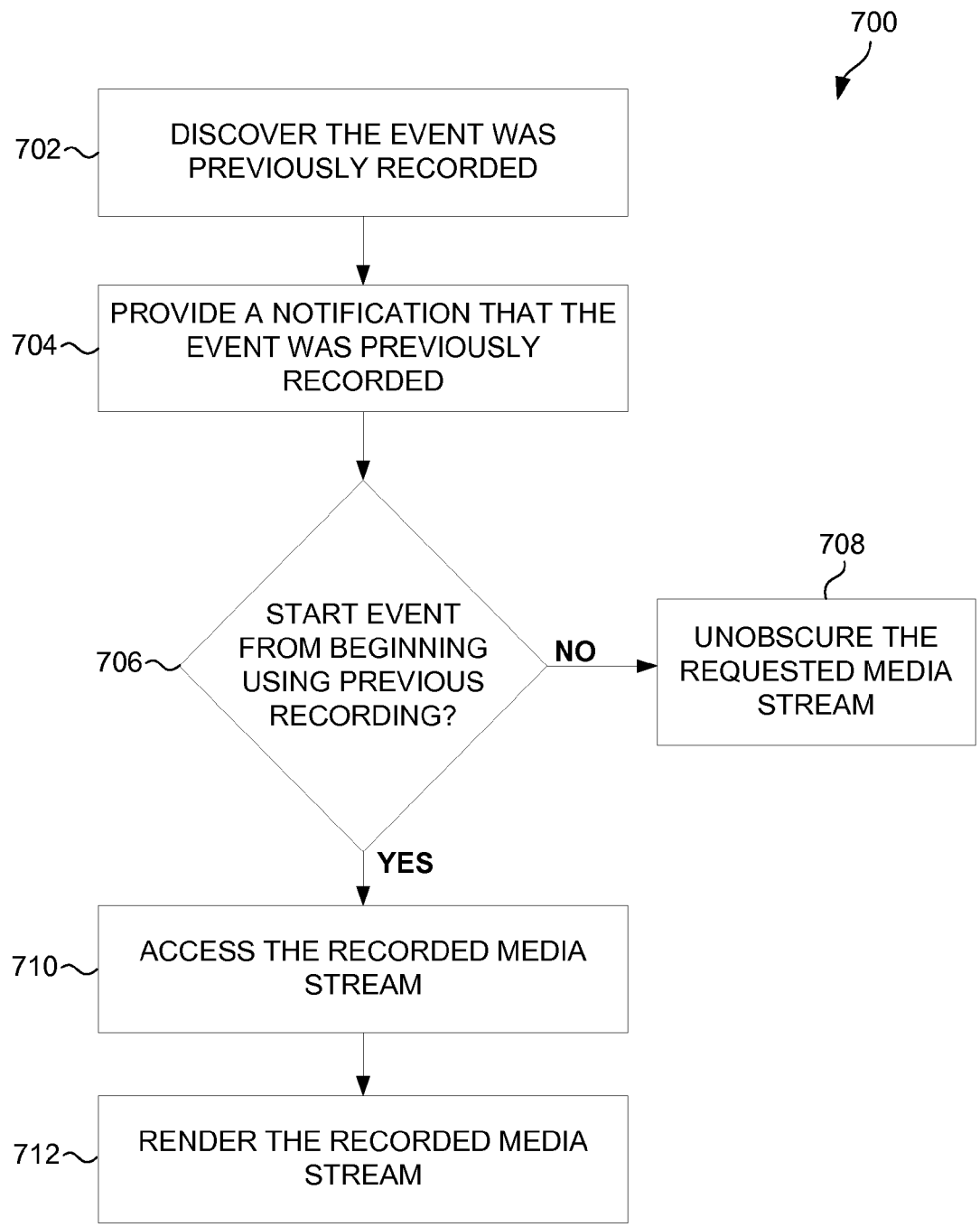
FIG. 7 illustrates an embodiment of a process for selectively accessing another media source.

FIG. 7 illustrates an embodiment of a process 700 for selectively accessing another media source. The operations of the process 700 of FIG. 7 are performed in combination with the operations of the process 400 of FIG. 4. Furthermore, the operations of FIG. 7 are discussed in reference to the systems and receiving devices described in reference to FIGS. 1 and 2. The operations of the process 700 of FIG. 7 are not all-inclusive, and may comprise additional operations described herein, and/or other operations not illustrated for the sake of brevity.

The process 700 includes discovering the event was previously recorded by the receiving device (operation 702). For example, the receiving device may have previously recorded the event if it was broadcast at an earlier time. The receiving device may have recorded the event on an internal or external storage unit. Operation 702 may be carried out as part of operation 406 illustrated in FIG. 4. For example, as part of identifying whether the event is accessible through another media source, the receiving device may discover that the event was previously recorded (i.e., the event is accessible through the storage unit of the receiving device). Based on the discovery in operation 702, the process 700 then provides a notification to the user that the event was previously recorded (operation 704). Operation 704 may be carried out as part of operation 412 illustrated in FIG. 4. For example, the notification provided in operation 412 may include an indication that the event was previously recorded, and may ask the user whether to begin rendering the recorded media stream or to unobscure the requested media stream. The process 700 then receives the user's response to the notification and identifies whether to start the event from the beginning using the automatically recorded media stream (operation 706). If the user instructs the receiving device not to start the event from the beginning, then the process 700 unobscures the requested media stream (operation 708) and provides the rendered audio/video stream to a presentation device. If the user instructs the receiving device to start the event from the beginning using the previously recorded media stream, then the process 700 accesses the recorded media stream from the storage unit (operation 710) and renders an audio/video stream from the recorded media stream (operation 712). Thus, through the process 700 illustrated in FIG. 7 (and the process 400 illustrated in FIG. 4), a user is selectively prevented from viewing an in-progress event and is given the option to view the event using a media stream that was previously recorded by the receiving device.

Figure 8:
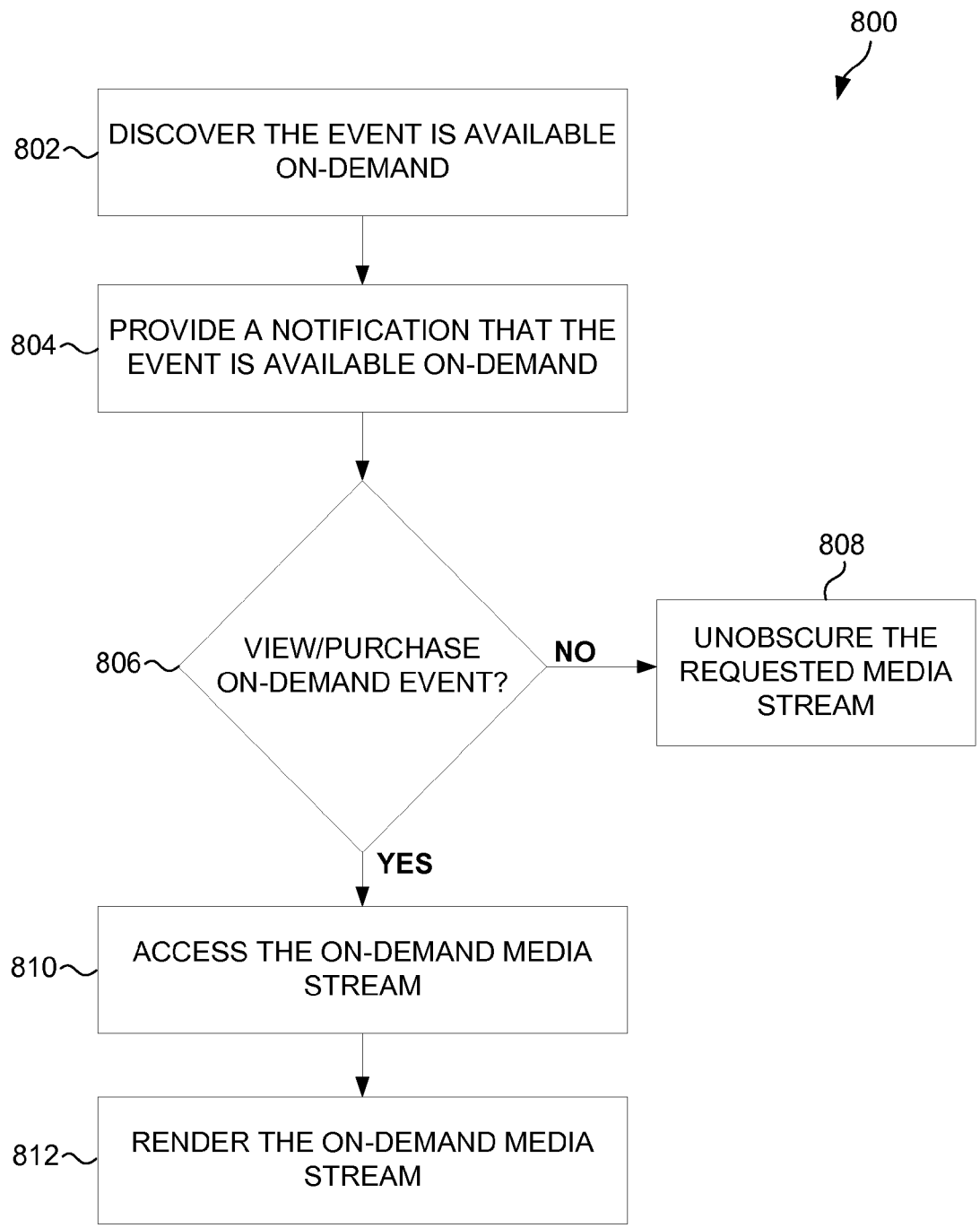
FIG. 8 illustrates an embodiment of a process for selectively accessing another media source.

FIG. 8 illustrates an embodiment of a process 800 for selectively accessing another media source. The operations of the process 800 of FIG. 8 are performed in combination with the operations of the process 400 of FIG. 4. Furthermore, the operations of FIG. 8 are discussed in reference to the systems and receiving devices described in reference to FIGS. 1 and 2. The operations of the process 800 of FIG. 8 are not all-inclusive, and may comprise additional operations described herein, and/or other operations not illustrated for the sake of brevity.

The process 800 includes discovering the event is available through an on-demand media source (operation 802). For example, a broadcaster or television provider may provide particular events to the receiving device through an on-demand or pay-per-view service. The on-demand or pay-per-view media stream may be provided to the receiving device through the television distribution network illustrated in FIG. 1. Operation 802 may be carried out as part of operation 406 illustrated in FIG. 4. For example, as part of identifying whether the event is accessible through another media source, the receiving device may discover that the event is available as an on-demand media stream (i.e., the event is accessible through the television distribution network at a variety of times). Based on the discovery in operation 802, the process 800 then provides a notification to the user that the event is available on-demand (operation 804). Operation 804 may be carried out as part of operation 412 illustrated in FIG. 4. For example, the notification provided in operation 412 may include an indication that the event is available on-demand, and may ask the user whether to view/purchase the on-demand media stream or to unobscure the requested media stream. In some implementations, the on-demand media stream may be a pay-per-view media stream, and the notification may further include pricing information for the per-per-view event. The process 800 then receives the user's response to the notification and identifies whether to view and/or purchase the on-demand event (operation 806). If the user instructs the receiving device not to view/purchase the on-demand event, then the process 800 unobscures the requested media stream (operation 808) and provides the rendered audio/video stream to a presentation device. If the user instructs the receiving device to view/purchase the on-demand event, then the process 800 accesses the on-demand media stream from the television distribution network (operation 810) and renders an audio/video stream from the on-demand media stream (operation 812). Thus, through the process 800 illustrated in FIG. 8 (and the process 400 illustrated in FIG. 4), a user is selectively prevented from viewing an in-progress event and is given the option to view/purchase the event through an on-demand or pay-per-view media source.

Figure 9:
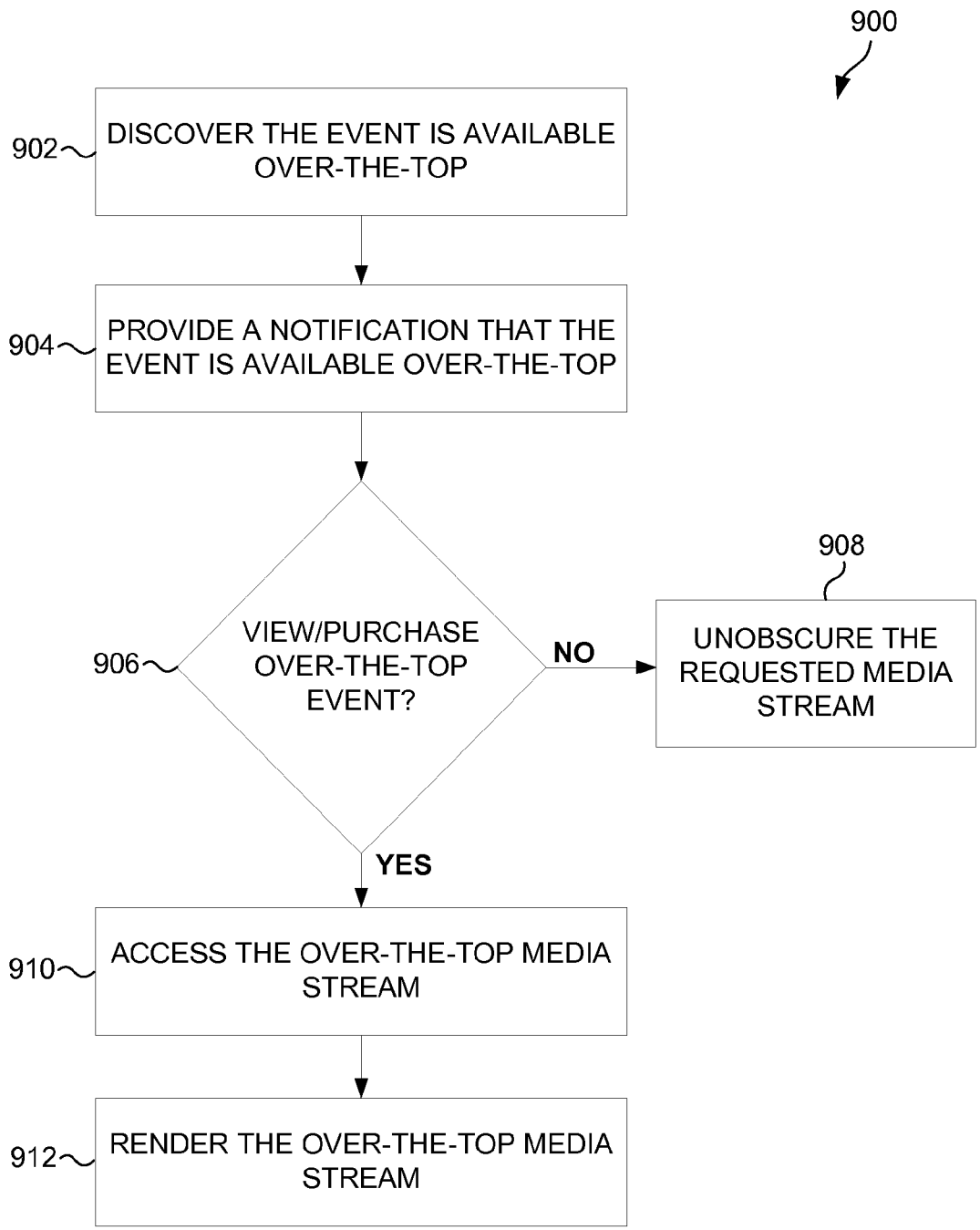
FIG. 9 illustrates an embodiment of a process for selectively accessing another media source.

FIG. 9 illustrates an embodiment of a process 900 for selectively accessing another media source. The operations of the process 900 of FIG. 9 are performed in combination with the operations of the process 400 of FIG. 4. Furthermore, the operations of FIG. 9 are discussed in reference to the systems and receiving devices described in reference to FIGS. 1 and 2. The operations of the process 900 of FIG. 9 are not all-inclusive, and may comprise additional operations described herein, and/or other operations not illustrated for the sake of brevity.

The process 900 includes discovering the event is available through an over-the-top media source (operation 902). For example, the receiving device may have access to services that provide media streaming over the Internet. The over-the-top media stream may be provided to the receiving device through the data communication network illustrated in FIG. 1. Operation 902 may be carried out as part of operation 406 illustrated in FIG. 4. For example, as part of identifying whether the event is accessible through another media source, the receiving device may discover that an over-the-top media source provides access to the event (e.g., the event is accessible through an Internet-based media streaming service using the data communication network). Based on the discovery in operation 902, the process 900 then provides a notification to the user that the event is available as an over-the-top media stream (operation 904). Operation 904 may be carried out as part of operation 412 illustrated in FIG. 4. For example, the notification provided in operation 412 may include an indication that the event is available as an over-the-top media stream, and may ask the user whether to view/purchase the over-the-top media stream or to unobscure the requested media stream. In some implementations, accessing the over-the-top media stream may require a subscription or payment to the Internet-based media streaming service, and the notification may further include pricing information for accessing the event using the over-the-top media source. The process 900 then receives the user's response to the notification and identifies whether to view and/or purchase the event from the over-the-top media source (operation 906). If the user instructs the receiving device not to view/purchase the over-the-top event, then the process 900 unobscures the requested media stream (operation 908) and provides the rendered audio/video stream to a presentation device. If the user instructs the receiving device to view/purchase the event from the over-the-top media source, then the process 900 accesses the over-the-top media stream from the data communication network (operation 910) and renders an audio/video stream from the over-the-top media stream (operation 912). Thus, through the process 900 illustrated in FIG. 9 (and the process 400 illustrated in FIG. 4), a user is selectively prevented from viewing an in-progress event and is given the option to view/purchase the event through an over-the-top media source, such as an Internet-based media streaming service.

Figure 10:
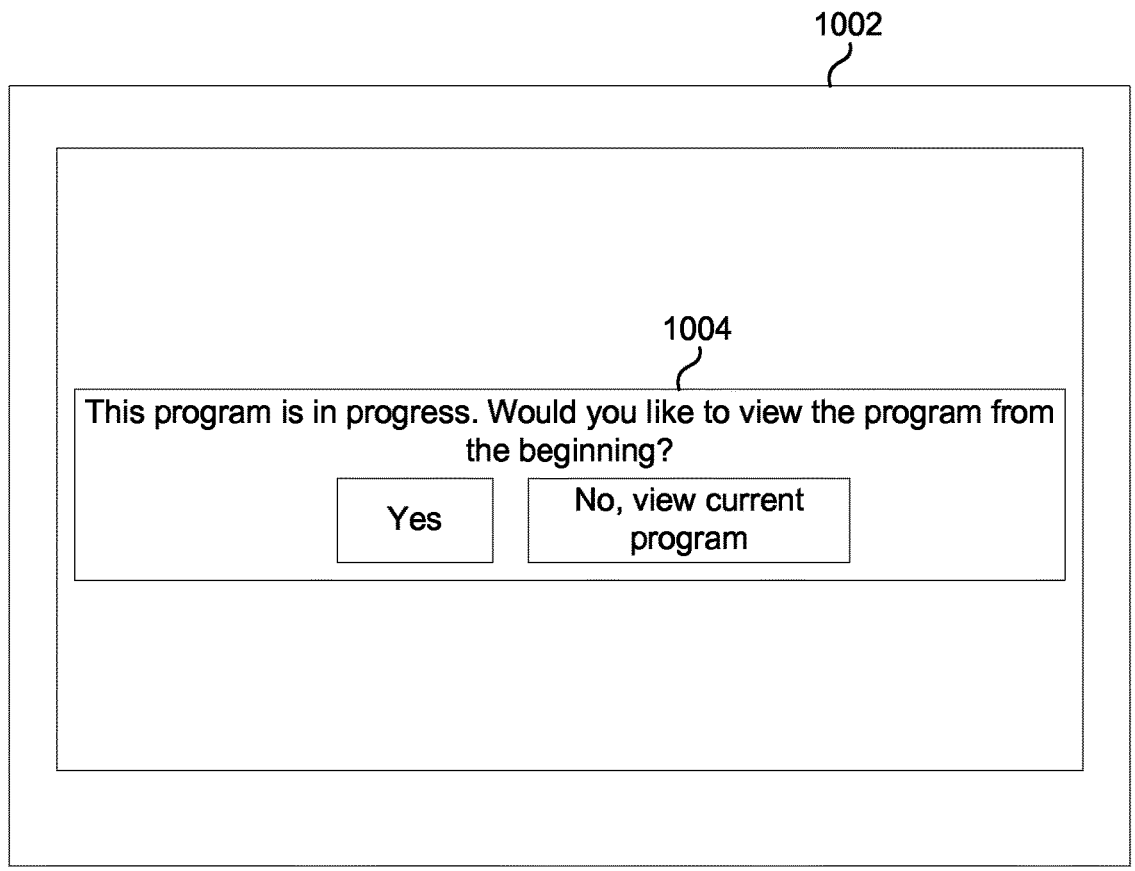
FIG. 10 illustrates an embodiment of a presentation device for presenting an audio/video stream to a user.

FIG. 10 illustrates an embodiment of a presentation device 1002 for presenting an audio/video stream to a user. A receiving device may obscure the audio/video stream using a notification 1004. The notification 1004 may inform the user that an event within the audio/video stream (e.g., a television program) has already begun, and that the event is available to watch from the beginning using another media source. The notification 1004 may further provide the user with an option to unobscure the in-progress event, or to view the event from the beginning using the other media source. In this way, the user is prevented from viewing an event that has already started without explicit input from the user.

Although specific embodiments were described herein, the scope of the invention is not limited to those specific embodiments. The scope of the invention is defined by the following claims and any equivalents therein.

What is claimed is:

1. A method for selectively obscuring a rendering of a media stream, comprising:
receiving a request to render the media stream, wherein the media stream is accessed through a first media source, wherein the first media source is selected by a user;
identifying a content identifier for an event within the requested media stream;
identifying a scheduled start time of the event, wherein the request to render the media stream occurs after the scheduled start time;
determining whether the request is received outside of a predetermined time window from the scheduled start time in the first media source;
responsive to a determination that the request is received outside of the predetermined time window,
based upon the content identifier, discovering that the event is accessible through at least one second media source, and wherein the event is available through the at least one second media source at a later time,
obscuring the rendering of the requested media stream, and
providing a notification that the event within the requested media stream is accessible through the at least one second media source; and
receiving a command to record the event within the media stream at the later time, wherein the obscuring includes:
delaying the access to the media stream for a predetermined amount of time, and
providing access to the media stream if a command to switch to the second media source is not received within the predetermined time.

2. The method of claim 1, further comprising:
receiving a command to access the event through the at least one second media source.

3. The method of claim 1, further comprising:
receiving a command to unobscure the rendering of the requested media stream.

4. The method of claim 1, wherein the first media source comprises a first television channel from a first broadcast station.

5. The method of claim 1, wherein the at least one second media source comprises a storage medium.

6. The method of claim 5, wherein the storage medium includes user-recorded content, automatically-recorded content, or a combination thereof.

7. The method of claim 1, wherein the at least one second media source comprises one or more of an on-demand media streaming service, a pay-per-view media streaming service, an over-the-top media streaming service, and a second television channel from a second broadcast station.

8. The method of claim 1, wherein the notification obscures the rendering of the requested media stream.

9. The method of claim 1, wherein the notification comprises one or more of a visual notification, an audio notification, or a tactile notification.

10. The method of claim 1, wherein the notification provides information about the event within the requested media stream.

11. The method of claim 1, wherein the at least one second media source comprises a recording of the event, the recording including the beginning of the event.

12. The method of claim 1, wherein obscuring the requested media stream comprises:

generating an overlay over the visual rendering of the requested media stream; and muting the audio rendering of the requested media stream.

13. A receiving device for selectively obscuring a rendering of a media stream, comprising:
   a user communication module for receiving a request to render the media stream, wherein the media stream is accessed through a first media source, wherein the first media source is selected by a user;
   control logic for:
      identifying a content identifier for an event within the requested media stream,
      identifying a scheduled start time of the event, wherein the request to render the media stream occurs after the scheduled start time,
      determining whether the request is received outside of a predetermined time window from the scheduled start time, and
      responsive to a determination that the request is received outside of the predetermined time window, based upon the content identifier, discovering that the event is accessible through at least one second media source, and wherein the event is available through the at least one second media source at a later time, and wherein the user communication module is further configured to receive a command to record the event within the media stream at the later time; and
   a rendering module for:
      responsive to a determination that the request is received outside of the predetermined time window,
      obscuring the rendering of the requested media stream, and
      generating a notification that the event within the requested media stream is accessible through the at least one second media source, wherein the obscuring includes:
         delaying the access to the requested media stream for a predetermined amount of time, and
         providing access to the requested media stream if a command to switch to the at least one second media source is not received within the predetermined time.

14. The receiving device of claim 13, wherein the first media source comprises a first television channel from a first broadcast station.

15. The receiving device of claim 13, wherein the at least one second media source comprises a storage medium.

16. A system for selectively obscuring a rendering of a media stream, comprising:
   a receiving device comprising:
      a user communication module for receiving a request to render the media stream, wherein the media stream is accessed through a first media source, wherein the first media source is selected by a user;
      control logic for identifying a content identifier for an event within the requested media stream, and, based upon the content identifier, discovering that the event is accessible through at least one second media source, and wherein the event is available through the at least one second media source at a later time, and wherein the user communication module is further configured to receive a command to record the event within the media stream at the later time; and
      a rendering module for: responsive to a determination that the request is received outside of a predetermined time window from a scheduled start time of the event,
         obscuring the rendering of the requested media stream, and
         generating a notification that the event within the requested media stream is accessible through the at least one second media source, wherein the obscuring includes:
            delaying the access to the requested media stream for a predetermined amount of time, and
            providing access to the requested media stream if a command to switch to the at least one second media source is not received within the predetermined time; and
   a presentation device for displaying the notification.

* * * * *